(12) United States Patent
Perryman (10) Patent No.: US 11,372,266 B1
(45) Date of Patent: Jun. 28, 2022

(54) MULTI-FOCAL EYEWEAR

(71) Applicant: John Perryman, Lakehurst, NJ (US)

(72) Inventor: John Perryman, Lakehurst, NJ (US)

( * ) Notice: Subject to any disclaimer, the term of this patent is extended or adjusted under 35 U.S.C. 154(b) by 234 days.

(21) Appl. No.: 16/841,753

(22) Filed: Apr. 7, 2020

(51) Int. Cl.
*G02C 7/06* (2006.01)

(52) U.S. Cl.
CPC ...................... *G02C 7/06* (2013.01)

(58) Field of Classification Search
CPC . G02C 7/06; G02C 7/00; G02C 7/041; G02C 7/061
See application file for complete search history.

(56) References Cited

U.S. PATENT DOCUMENTS

| | | | |
|---|---|---|---|
| D204,956 S | 5/1966 | Ramp | |
| 5,790,226 A | 8/1998 | Pollak | |
| 5,953,099 A * | 9/1999 | Walach | G02C 7/06 351/159.48 |
| 6,250,759 B1 * | 6/2001 | Kerns, Jr. | G02C 7/104 351/159.41 |
| 6,488,374 B1 * | 12/2002 | Alberts | G02C 7/02 351/159.01 |
| 6,709,104 B1 * | 3/2004 | Alberts | G02C 7/02 351/159.48 |
| 6,860,599 B2 * | 3/2005 | Fuschi | G02C 7/06 351/159.48 |
| 10,429,672 B2 | 10/2019 | Curley | |
| 2002/0090192 A1 * | 7/2002 | O'Brien | G02B 6/266 385/140 |
| 2004/0119940 A1 * | 6/2004 | Kerns, Jr. | G02C 7/104 351/159.63 |
| 2004/0233384 A1 | 11/2004 | Gupta | |
| 2007/0268451 A1 | 11/2007 | Raghuprasad | |
| 2018/0157065 A1 * | 6/2018 | Curley | G02C 9/00 |
| 2020/0050022 A1 * | 2/2020 | Spratt | G02C 7/081 |

\* cited by examiner

*Primary Examiner* — William R Alexander
*Assistant Examiner* — Sharrief I Broome
(74) *Attorney, Agent, or Firm* — Kyle A. Fletcher, Esq.

(57) ABSTRACT

The multi-focal eyewear is a set of eyeglasses. The multi-focal eyewear is a prescription medical device used to correct and improve the vision of a patient. The multi-focal eyewear comprises an eyeglasses frame, a dexter lens, and a sinister lens. The dexter lens and the sinister lens mount in the eyeglasses frame. The dexter lens corrects the vision in the dexter eye of the patient. The sinister lens corrects the vision in the sinister eye of the patient. The dexter lens is a multi-focal lens. The sinister lens is a multi-focal lens.

18 Claims, 4 Drawing Sheets

MULTI-FOCAL EYEWEAR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of physics and optics including spectacles, more specifically, a lens system incorporating bifocal and multi-focal structures.

SUMMARY OF INVENTION

The multi-focal eyewear is a set of eyeglasses. The multi-focal eyewear is a prescription medical device used to correct and improve the vision of a patient. The multi-focal eyewear comprises an eyeglasses frame, a dexter lens, and a sinister lens. The dexter lens and the sinister lens mount in the eyeglasses frame. The dexter lens corrects the vision in the dexter eye of the patient. The sinister lens corrects the vision in the sinister eye of the patient. The dexter lens is a multi-focal lens. The sinister lens is a multi-focal lens. These together with additional objects, features and advantages of the multi-focal eyewear will be readily apparent to those of ordinary skill in the art upon reading the following detailed description of the presently preferred, but nonetheless illustrative, embodiments when taken in conjunction with the accompanying drawings.

In this respect, before explaining the current embodiments of the multi-focal eyewear in detail, it is to be understood that the multi-focal eyewear is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the multi-focal eyewear.

It is therefore important that the claims be regarded as including such equivalent construction insofar as they do not depart from the spirit and scope of the multi-focal eyewear. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
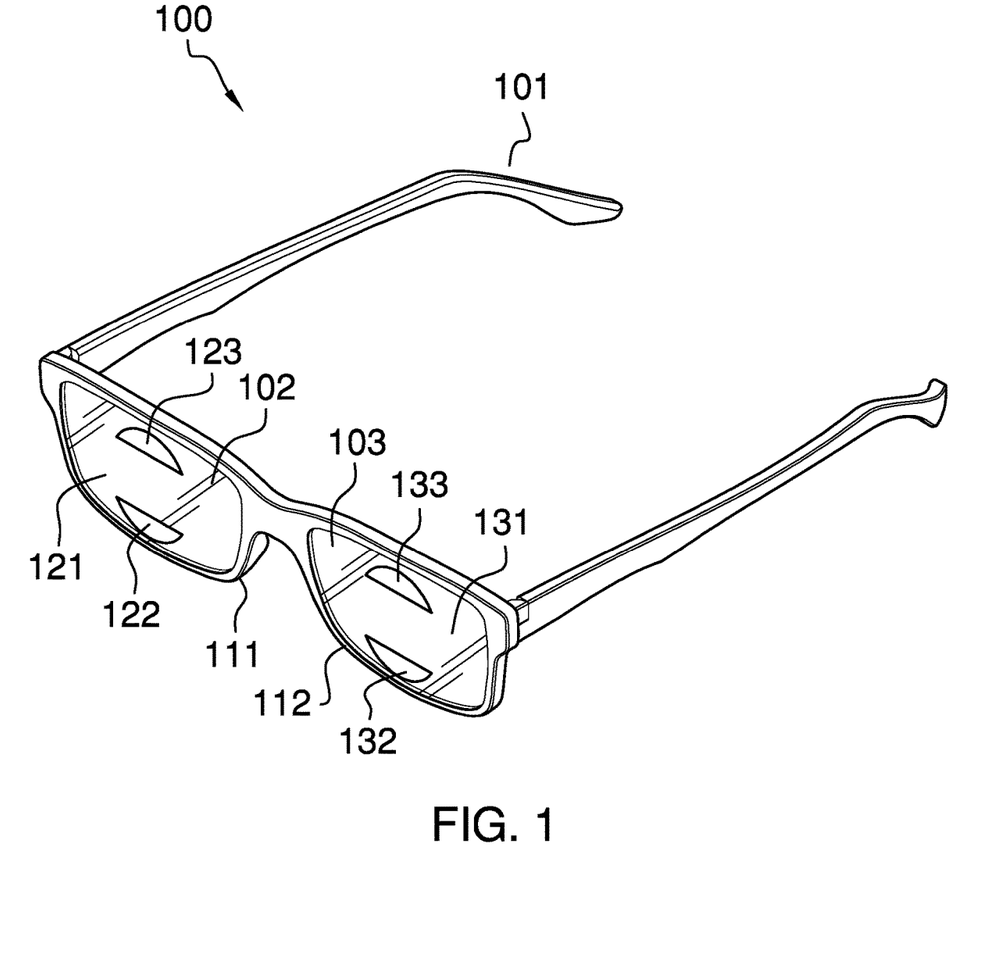
FIG. 1 is a perspective view of an embodiment of the disclosure.
Figure 2:
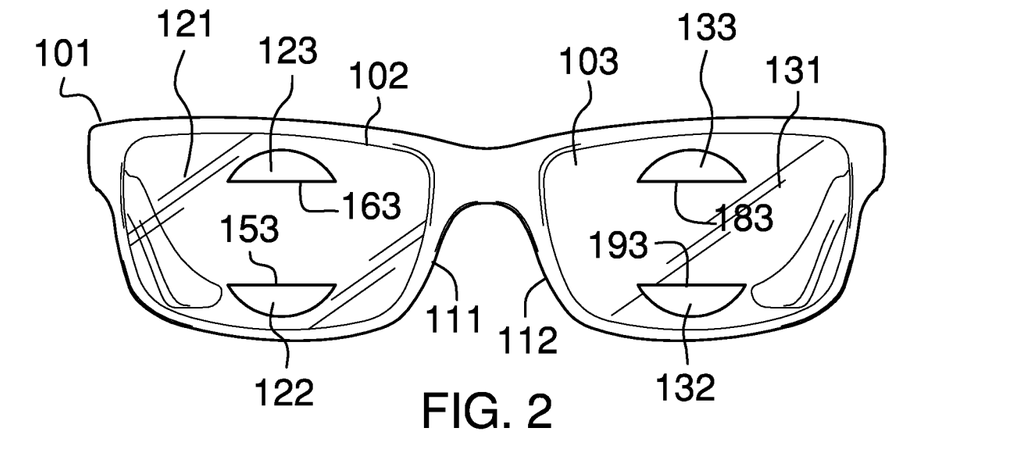
FIG. 2 is a front view of an embodiment of the disclosure.
Figure 3:
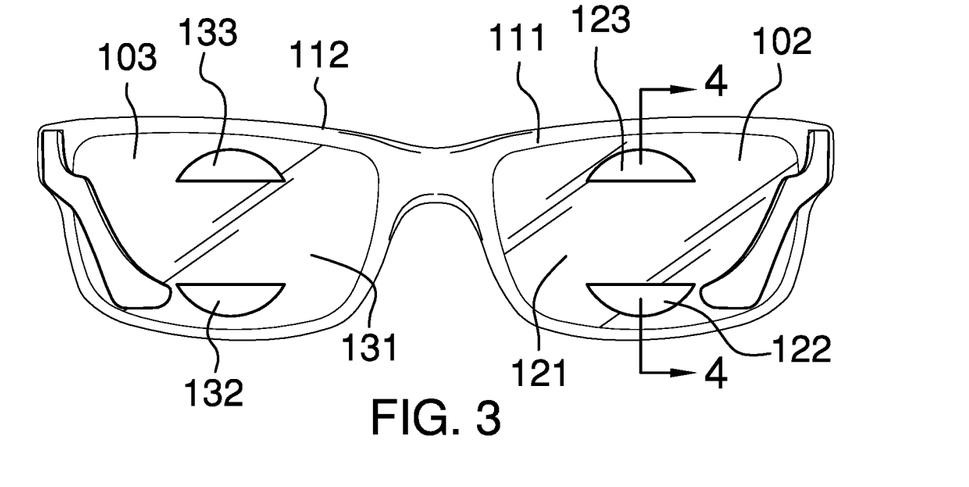
FIG. 3 is a rear view of an embodiment of the disclosure.
Figure 4:
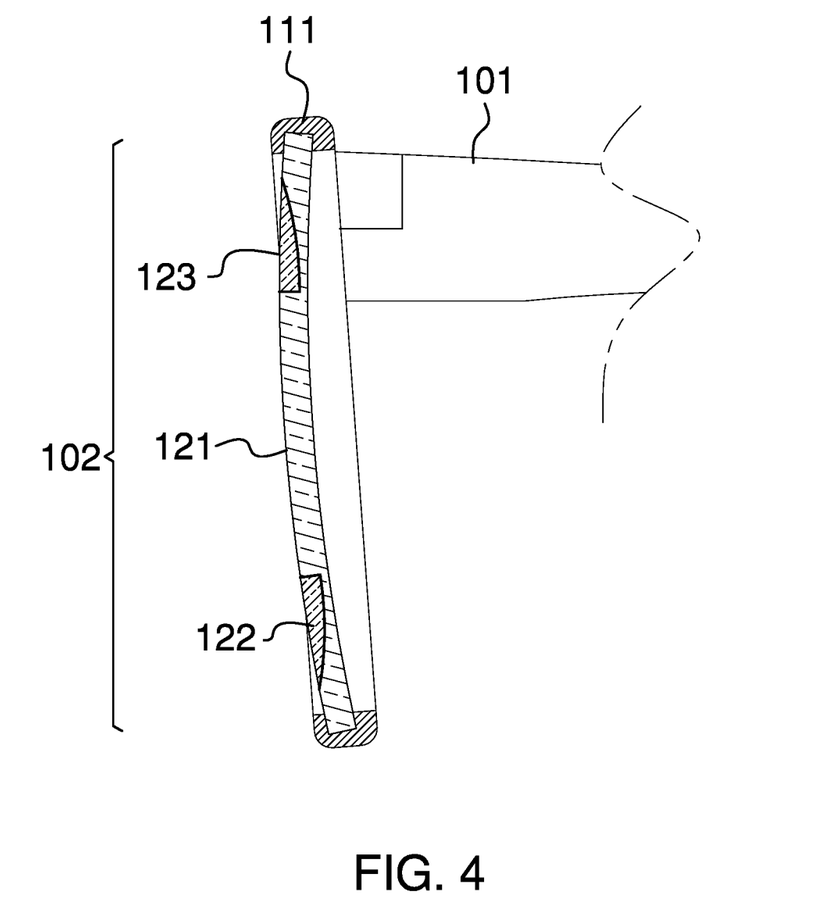
FIG. 4 is a cross-sectional view of an embodiment of the disclosure across 4-4 as shown in FIG. 3.
Figure 5:
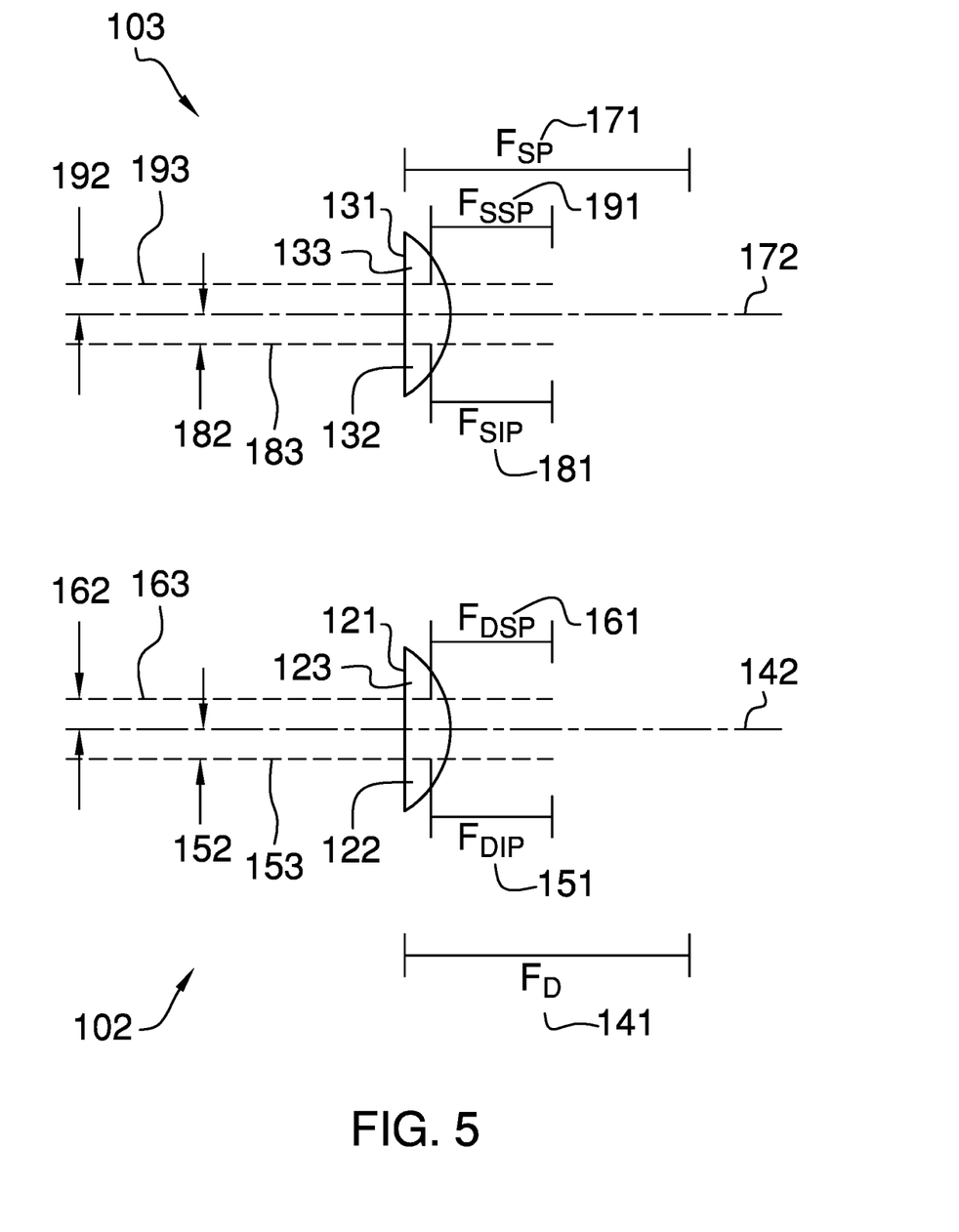
FIG. 5 is a view of an embodiment of the disclosure.

Detailed reference will now be made to one or more potential embodiments of the disclosure, which are illustrated in FIGS. 1 through 5.

The multi-focal eyewear 100 (hereinafter invention) is a set of eyeglasses. The invention 100 is a prescription medical device used to correct and improve the vision of a patient. The invention 100 comprises an eyeglasses frame 101, a dexter lens 102, and a sinister lens 103. The dexter lens 102 and the sinister lens 103 mount in the eyeglasses frame 101. The dexter lens 102 corrects the vision in the dexter eye of the patient. The sinister lens 103 corrects the vision in the sinister eye of the patient. The dexter lens 102 is a multi-focal lens. The sinister lens 103 is a multi-focal lens.

The eyeglasses frame 101 is a mechanical structure. The dexter lens 102 and the sinister lens 103 mount in the eyeglasses frame 101. The eyeglasses frame 101 forms a load path that transfers the load of the dexter lens 102 and the sinister lens 103 to the head of the patient. The eyeglasses frame 101 comprises a dexter lens 102 frame 111 and a sinister lens 103 frame 112. The dexter lens 102 frame 111 is a mechanical apparatus formed in the eyeglasses frame 101. The dexter lens 102 attaches to the eyeglasses frame 101 by mounting in the dexter lens 102 frame 111. The sinister lens 103 frame 112 is a mechanical apparatus formed in the eyeglasses frame 101. The sinister lens 103 attaches to the eyeglasses frame 101 by mounting in the sinister lens 103 frame 112.

The dexter lens 102 is a lens that is adapted to correct the vision of the dexter eye of the patient. The dexter lens 102 is a multi-focal lens. The dexter lens 102 is a prescription lens that is customized for use by the patient. The dexter lens 102 comprises a dexter primary lens 121, a dexter inferior secondary lens 122, and a dexter superior secondary lens 123.

The dexter primary lens 121 is a spherical lens. The dexter primary lens 121 is formed to correct the primary vision of the dexter eye of the patient. The dexter primary lens 121 further allows for the modification of the dexter primary lens 121 to correct for astigmatism. The dexter primary lens 121 comprises a dexter primary lens 121 power 141 and a dexter pupil center line 142.

The dexter primary lens 121 power 141 is a measure of the power of the dexter primary lens 121. The dexter primary lens 121 power 141 is determined during the examination process and is an element of the prescription that defines the dexter primary lens 121. The dexter primary lens 121 power 141 is a number equal to the inverse of the focal length of the dexter primary lens 121.

The dexter pupil center line 142 is the perpendicular line that projects away from the sagittal plane of the patient through the center of the pupil of the dexter eye of the patient. When the patient wears the eyeglasses frame 101 normally, the dexter pupil center line 142 extends through the dexter primary lens 121 to form a reference point used to position the dexter inferior secondary lens 122 and the dexter superior secondary lens 123 in the dexter primary lens 121.

The dexter inferior secondary lens 122 is a separately formed spherical lens structure that is formed in the dexter primary lens 121. The dexter inferior secondary lens 122 is formed to correct a secondary vision issue in the dexter eye of the patient. The secondary vision issue is selected from the group consisting of a near vision issue and a distance vision issue. The position of the dexter inferior secondary lens 122 is inferior to the position of the dexter superior secondary lens 123. When the patient wears the eyeglasses frame 101 normally, a line formed between the center of the dexter inferior secondary lens 122 and the center of the dexter superior secondary lens 123 extends to perpendicularly intersect with the transverse plane of the patient. The dexter inferior secondary lens 122 comprises a dexter inferior secondary lens 122 power 151, a dexter inferior secondary lens 122 segment span 152, and a dexter inferior secondary lens 122 line 153.

The dexter inferior secondary lens 122 power 151 is a measure of the power of the dexter inferior secondary lens 122. The dexter inferior secondary lens 122 power 151 is determined during the examination process and is an element of the prescription that defines the dexter inferior secondary lens 122. The dexter inferior secondary lens 122 power 151 is a number equal to the inverse of the focal length of the dexter inferior secondary lens 122.

The dexter inferior secondary lens 122 segment span 152 is a measure of the position of the dexter inferior secondary lens 122 on the dexter primary lens 121. The dexter inferior secondary lens 122 segment span 152 is determined during the examination process and is an element of the prescription that defines the dexter inferior secondary lens 122. The dexter inferior secondary lens 122 segment span 152 is the span of the distance between the dexter pupil center line 142 and the center of the dexter inferior secondary lens 122 line 153. The dexter inferior secondary lens 122 is positioned on the dexter primary lens 121 such that the line used to measure the dexter inferior secondary lens 122 segment span 152 is perpendicular to the transverse plane of the patient.

The dexter inferior secondary lens 122 line 153 is a straight line that forms the superior boundary of the dexter inferior secondary lens 122. The position of the dexter inferior secondary lens 122 line 153 is determined using the dexter inferior secondary lens 122 segment span 152 from the prescription that defines the dexter primary lens 121. When the patient wears the eyeglasses frame 101 normally, the dexter inferior secondary lens 122 line 153 is perpendicular to the sagittal plane of the patient.

The dexter superior secondary lens 123 is a separately formed spherical lens structure that is formed in the dexter primary lens 121. The dexter superior secondary lens 123 is formed to correct a secondary vision issue in the dexter eye of the patient. The secondary vision issue is selected from the group consisting of a near vision issue and a distance vision issue. The position of the dexter superior secondary lens 123 is superior to the dexter inferior secondary lens 122. When the patient wears the eyeglasses frame 101 normally, a line formed between the center of the dexter superior secondary lens 123 and the center of the dexter inferior secondary lens 122 extends to perpendicularly intersect with the transverse plane of the patient. The dexter superior secondary lens 123 comprise a dexter superior secondary lens 123 power 161, a dexter superior secondary lens 123 segment span 162, and a dexter superior secondary lens 123 line 163.

The dexter superior secondary lens 123 power 161 is a measure of the power of the dexter superior secondary lens 123. The dexter superior secondary lens 123 power 161 is determined during the examination process and is an element of the prescription that defines the dexter superior secondary lens 123. The dexter superior secondary lens 123 power 161 is a number equal to the inverse of the focal length of the dexter superior secondary lens 123.

The dexter superior secondary lens 123 segment span 162 is a measure of the position of the dexter superior secondary lens 123 on the dexter inferior secondary lens 122 line 153. The dexter superior secondary lens 123 segment span 162 is determined during the examination process and is an element of the prescription that defines the dexter superior secondary lens 123. The dexter superior secondary lens 123 segment span 162 is the span of the distance between the dexter pupil center line 142 and the center of the dexter superior secondary lens 123 line 163. The dexter superior secondary lens 123 is positioned on the eyeglasses frame 101 such that the line used to measure the dexter superior secondary lens 123 segment span 162 is perpendicular to the transverse plane of the patient.

The dexter superior secondary lens 123 line 163 is a straight line that forms the inferior boundary of the dexter superior secondary lens 123. The position of the dexter superior secondary lens 123 line 163 is determined using the dexter superior secondary lens 123 segment span 162 from the prescription that defines the eyeglasses frame 101. When the patient wears the eyeglasses frame 101 normally, the dexter superior secondary lens 123 line 163 is perpendicular to the sagittal plane of the patient.

The sinister lens 103 is a lens that is adapted to correct the vision of the sinister eye of the patient. The sinister lens 103 is a multi-focal lens. The sinister lens 103 is a prescription lens that is customized for use by the patient. The sinister lens 103 comprises a sinister primary lens 131, a sinister inferior secondary lens 132, and a sinister superior secondary lens 133.

The sinister primary lens 131 is a spherical lens. The sinister primary lens 131 is formed to correct the primary vision of the sinister eye of the patient. The sinister primary lens 131 further allows for the modification of the sinister primary lens 131 to correct for astigmatism. The sinister primary lens 131 comprises a sinister primary lens 131 power 171 and a sinister pupil center line 172.

The sinister primary lens 131 power 171 is a measure of the power of the sinister primary lens 131. The sinister primary lens 131 power 171 is determined during the examination process and is an element of the prescription that defines the sinister primary lens 131. The sinister primary lens 131 power 171 is a number equal to the inverse of the focal length of the sinister primary lens 131.

The sinister pupil center line 172 is the perpendicular line that projects away from the sagittal plane of the patient through the center of the pupil of the dexter eye of the patient. When the patient wears the eyeglasses frame 101 normally, the sinister pupil center line 172 extends through the sinister primary lens 131 to form a reference point used to position the sinister inferior secondary lens 132 and the sinister superior secondary lens 133 in the sinister primary lens 131.

The sinister inferior secondary lens 132 is a separately formed spherical lens structure that is formed in the sinister primary lens 131. The sinister inferior secondary lens 132 is formed to correct a secondary vision issue in the sinister eye of the patient. The secondary vision issue is selected from the group consisting of a near vision issue and a distance vision issue. The position of the sinister inferior secondary lens 132 is superior to the position of the sinister superior secondary lens 133. When the patient wears the eyeglasses frame 101 normally, a line formed between the center of the sinister inferior secondary lens 132 and the center of the sinister superior secondary lens 133 extends to perpendicularly intersect with the transverse plane of the patient. The sinister inferior secondary lens 132 comprises a sinister inferior secondary lens 132 power 181, a sinister inferior secondary lens 132 segment span 182, and a sinister inferior secondary lens 132 line 183.

The sinister inferior secondary lens 132 power 181 is a measure of the power of the sinister inferior secondary lens 132. The sinister inferior secondary lens 132 power 181 is determined during the examination process and is an element of the prescription that defines the sinister inferior secondary lens 132. The sinister inferior secondary lens 132 power 181 is a number equal to the inverse of the focal length of the sinister inferior secondary lens 132.

The sinister inferior secondary lens 132 segment span 182 is a measure of the position of the sinister inferior secondary lens 132 on the sinister primary lens 131. The sinister inferior secondary lens 132 segment span 182 is determined during the examination process and is an element of the prescription that defines the sinister inferior secondary lens 132. The sinister inferior secondary lens 132 segment span 182 is the span of the distance between the sinister pupil center line 172 and the center of the sinister inferior secondary lens 132 line 183. The sinister inferior secondary lens 132 is positioned on the sinister primary lens 131 such that the line used to measure the sinister inferior secondary lens 132 segment span 182 is perpendicular to the transverse plane of the patient.

The sinister inferior secondary lens 132 line 183 is a straight line that forms the superior boundary of the sinister inferior secondary lens 132. The position of the sinister inferior secondary lens 132 line 183 is determined using the sinister inferior secondary lens 132 segment span 182 from the prescription that defines the sinister primary lens 131. When the patient wears the eyeglasses frame 101 normally, the sinister inferior secondary lens 132 line 183 is perpendicular to the sagittal plane of the patient.

The sinister superior secondary lens 133 is a separately formed spherical lens structure that is formed in the sinister primary lens 131. The sinister superior secondary lens 133 is formed to correct a secondary vision issue in the sinister eye of the patient. The secondary vision issue is selected from the group consisting of a near vision issue and a distance vision issue. The position of the sinister superior secondary lens 133 is superior to the sinister inferior secondary lens 132. When the patient wears the eyeglasses frame 101 normally, a line formed between the center of the sinister superior secondary lens 133 and the center of the sinister inferior secondary lens 132 extends to perpendicularly intersect with the transverse plane of the patient. The sinister superior secondary lens 133 comprises a sinister superior secondary lens 133 power 191, a sinister superior secondary lens 133 segment span 192, and a sinister superior secondary lens 133 line 193.

The sinister superior secondary lens 133 power 191 is a measure of the power of the sinister superior secondary lens 133. The sinister superior secondary lens 133 power 191 is determined during the examination process and is an element of the prescription that defines the sinister superior secondary lens 133. The sinister superior secondary lens 133 power 191 is a number equal to the inverse of the focal length of the sinister superior secondary lens 133.

The sinister superior secondary lens 133 segment span 192 is a measure of the position of the sinister superior secondary lens 133 on the sinister inferior secondary lens 132 line 183. The sinister superior secondary lens 133 segment span 192 is determined during the examination process and is an element of the prescription that defines the sinister superior secondary lens 133. The sinister superior secondary lens 133 segment span 192 is the span of the distance between the sinister pupil center line 172 and the center of the sinister superior secondary lens 133 line 193. The sinister superior secondary lens 133 is positioned on the eyeglasses frame 101 such that the line used to measure the sinister superior secondary lens 133 segment span 192 is perpendicular to the transverse plane of the patient.

The sinister superior secondary lens 133 line 193 is a straight line that forms the inferior boundary of the sinister superior secondary lens 133. The position of the sinister superior secondary lens 133 line 193 is determined using the sinister superior secondary lens 133 segment span 192 from the prescription that defines the eyeglasses frame 101. When the patient wears the eyeglasses frame 101 normally, the sinister superior secondary lens 133 line 193 is perpendicular to the sagittal plane of the patient.

In the first potential embodiment of the disclosure: The dexter inferior secondary lens 122 power 151 equals the dexter superior secondary lens 123 power 161. The dexter inferior secondary lens 122 segment span 152 equals the dexter superior secondary lens 123 segment span 162. The sinister inferior secondary lens 132 power 181 equals the sinister superior secondary lens 133 power 191. The sinister inferior secondary lens 132 segment span 182 equals the sinister superior secondary lens 133 segment span 192.

The following definitions were used in this disclosure:

Anterior: As used in this disclosure, anterior is a term that is used to refer to the front side or direction of a structure. When comparing two objects, the anterior object is the object that is closer to the front of the structure.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Coronal Plane: As used in this disclosure, the coronal plane refers to a reference plane that bisects the anterior side and the posterior side. The coronal plane is also referred to as the lateral plane.

Dexter: As used in this disclosure, dexter is a directional reference that refers to the right side of the body or the right side of an object from the perspective of a viewer who is facing the posterior side of the object.

Eyeglasses: As used in this disclosure, eyeglasses are a pair of lenses held in a frame that are worn over the eyes. Eyeglasses are used to help with vision.

Frame: As used in this disclosure, a frame is a structure or a first sub-structure: a) to which an object or a second sub-structure attaches; and, b) which forms a portion of the load path of the object or the second sub-structure.

Inferior: As used in this disclosure, inferior refers to a directional sense or location of the body. Specifically, inferior refers to an object or a side of an object that is proximal to the feet or distal from the head of the body.

Lens: As used in this disclosure, a lens is a transparent substance through which light can pass. A lens may or may not be formed with curved surfaces that are used to concentrate or disperse the light that travels through the lens. A lens can also project a focused image on a surface known as a virtual image. A lens may also be used to change the apparent size of the virtual image. A magnifying lens (also known as a magnifying glass) is a lens that increases the apparent size of a virtual image.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Patient: As used in this disclosure, a patient is a person who is designated to receive a medical treatment, therapy or service. The term patient may be extended to an animal when used within the context of the animal receiving veterinary treatment or services.

Sagittal Plane: As used in this disclosure, the sagittal plane refers to a plane that is perpendicular to both the coronal (or lateral) plane and the transverse plane. The sagittal bisects the dexter side and the sinister side.

Sinister: As used in this disclosure, sinister is a directional reference that refers to the left side of the body or the left side of an object from the perspective of a viewer who is facing the posterior side of the object.

Superior: As used in this disclosure, superior refers to a directional sense or location of the body. Specifically, superior refers to an object or a side of an object that is distal from the feet or proximal to the head of the body.

Transverse Plane: As used in this disclosure, a transverse plane is a plane that divides an object into a superior section and an inferior section. In a person the transverse plane would be perpendicular to the medial axis of a body.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A multi-focal eyewear comprising
an eyeglasses frame, a dexter lens, and a sinister lens;
wherein the dexter lens and the sinister lens mount in the eyeglasses frame;
wherein the multi-focal eyewear is a prescription medical device used to correct and improve vision;
wherein the eyeglasses frame is a mechanical structure;
wherein the dexter lens is a multi-focal lens;
wherein the sinister lens is a multi-focal lens;
wherein the eyeglasses frame forms a load path that transfers the load of the dexter lens and the sinister lens;
wherein the eyeglasses frame comprises a dexter lens frame and a sinister lens frame;
wherein the dexter lens comprises a dexter primary lens, a dexter inferior secondary lens, and a dexter superior secondary lens;
wherein the dexter inferior secondary lens is a separately formed spherical lens structure that is formed in the dexter primary lens;
wherein the dexter superior secondary lens is a separately formed spherical lens structure that is formed in the dexter primary lens.

2. The multi-focal eyewear according to claim 1
wherein the dexter lens frame is a mechanical apparatus formed in the eyeglasses frame;
wherein the sinister lens frame is a mechanical apparatus formed in the eyeglasses frame;
wherein the dexter lens attaches to the eyeglasses frame by mounting in the dexter lens frame;
wherein the sinister lens attaches to the eyeglasses frame by mounting in the sinister lens frame.

3. The multi-focal eyewear according to claim 2
wherein the dexter lens is a multi-focal lens;
wherein the dexter lens is a customized prescription lens.

4. The multi-focal eyewear according to claim 3
wherein the sinister lens is a multi-focal lens;
wherein the sinister lens is a customized prescription lens.

5. The multi-focal eyewear according to claim 4
wherein the sinister lens comprises a sinister primary lens, a sinister inferior secondary lens, and a sinister superior secondary lens;
wherein the sinister inferior secondary lens is a separately formed spherical lens structure that is formed in the sinister primary lens;
wherein the sinister superior secondary lens is a separately formed spherical lens structure that is formed in the sinister primary lens.

6. The multi-focal eyewear according to claim 5
wherein the dexter primary lens is a spherical lens;
wherein the dexter primary lens is formed to correct the primary vision;
wherein the dexter primary lens further allows for the modification of the dexter primary lens to correct for astigmatism.

7. The multi-focal eyewear according to claim 6
wherein the sinister primary lens is a spherical lens;
wherein the sinister primary lens is formed to correct the primary vision;
wherein the sinister primary lens further allows for the modification of the sinister primary lens to correct for astigmatism.

8. The multi-focal eyewear according to claim 7
wherein the dexter primary lens comprises a dexter primary lens power and a dexter pupil center line;
wherein the dexter primary lens power is a measure of the power of the dexter primary lens;
wherein the dexter primary lens power is determined during the examination process and is an element of the prescription that defines the dexter primary lens;
wherein the dexter primary lens power is a number equal to the inverse of the focal length of the dexter primary lens;
wherein the dexter pupil center line is the perpendicular line that projects away from the sagittal plane through the center of the dexter pupil;
wherein the dexter pupil center line extends through the dexter primary lens to form a reference point used to position the dexter inferior secondary lens and the dexter superior secondary lens in the dexter primary lens.

9. The multi-focal eyewear according to claim 8
wherein the sinister primary lens comprises a sinister primary lens power and a sinister pupil center line;
wherein the sinister primary lens power is a measure of the power of the sinister primary lens;
wherein the sinister primary lens power is determined during the examination process and is an element of the prescription that defines the sinister primary lens;
wherein the sinister primary lens power is a number equal to the inverse of the focal length of the sinister primary lens;
wherein the sinister pupil center line is the perpendicular line that projects away from the sagittal plane through the center of the sinister pupil;
wherein the sinister pupil center line extends through the sinister primary lens to form a reference point used to position the sinister inferior secondary lens and the sinister superior secondary lens in the sinister primary lens.

10. The multi-focal eyewear according to claim 9
wherein the dexter inferior secondary lens is formed to correct a secondary vision issue;
wherein the secondary vision issue is selected from the group consisting of a near vision issue and a distance vision issue;
wherein the position of the dexter inferior secondary lens is inferior to the position of the dexter superior secondary lens;
wherein a line formed between the center of the dexter inferior secondary lens and the center of the dexter superior secondary lens extends to perpendicularly intersect with the transverse plane.

11. The multi-focal eyewear according to claim 10
wherein the dexter superior secondary lens is formed to correct a secondary vision issue;
wherein the secondary vision issue is selected from the group consisting of a near vision issue and a distance vision issue;
wherein the position of the dexter superior secondary lens is superior to the dexter inferior secondary lens;
wherein a line formed between the center of the dexter superior secondary lens and the center of the dexter inferior secondary lens extends to perpendicularly intersect with the transverse plane.

12. The multi-focal eyewear according to claim 11
wherein the sinister inferior secondary lens is formed to correct a secondary vision issue;
wherein the secondary vision issue is selected from the group consisting of a near vision issue and a distance vision issue;
wherein the position of the sinister inferior secondary lens is inferior to the position of the sinister superior secondary lens;
wherein a line formed between the center of the sinister inferior secondary lens and the center of the sinister superior secondary lens extends to perpendicularly intersect with the transverse plane.

13. The multi-focal eyewear according to claim 12
wherein the sinister superior secondary lens is formed to correct a secondary vision issue;
wherein the secondary vision issue is selected from the group consisting of a near vision issue and a distance vision issue;
wherein the position of the sinister superior secondary lens is superior to the sinister inferior secondary lens;
wherein a line formed between the center of the sinister superior secondary lens and the center of the sinister inferior secondary lens extends to perpendicularly intersect with the transverse plane.

14. The multi-focal eyewear according to claim 13
wherein the dexter inferior secondary lens comprises a dexter inferior secondary lens power, a dexter inferior secondary lens segment span, and a dexter inferior secondary lens line;
wherein the dexter inferior secondary lens power is a measure of the power of the dexter inferior secondary lens;
wherein the dexter inferior secondary lens power is determined during the examination process and is an element of the prescription that defines the dexter inferior secondary lens;
wherein the dexter inferior secondary lens power is a number equal to the inverse of the focal length of the dexter inferior secondary lens;
wherein the dexter inferior secondary lens segment span is a measure of the position of the dexter inferior secondary lens on the dexter primary lens;
wherein the dexter inferior secondary lens segment span is determined during the examination process and is an element of the prescription that defines the dexter inferior secondary lens;
wherein the dexter inferior secondary lens segment span is the span of the distance between the dexter pupil center line and the center of the dexter inferior secondary lens line;
wherein the dexter inferior secondary lens is positioned on the dexter primary lens such that the line used to measure the dexter inferior secondary lens segment span is perpendicular to the transverse plane;
wherein the dexter inferior secondary lens line is a straight line that forms the superior boundary of the dexter inferior secondary lens;
wherein the position of the dexter inferior secondary lens line is determined using the dexter inferior secondary lens segment span from the prescription that defines the dexter primary lens;

wherein the dexter inferior secondary lens line is perpendicular to the sagittal plane.

15. The multi-focal eyewear according to claim 14
wherein the dexter superior secondary lens comprises a dexter superior secondary lens power, a dexter superior secondary lens segment span, and a dexter superior secondary lens line;
wherein the dexter superior secondary lens power is a measure of the power of the dexter superior secondary lens;
wherein the dexter superior secondary lens power is determined during the examination process and is an element of the prescription that defines the dexter superior secondary lens;
wherein the dexter superior secondary lens power is a number equal to the inverse of the focal length of the dexter superior secondary lens;
wherein the dexter superior secondary lens segment span is a measure of the position of the dexter superior secondary lens on the dexter inferior secondary lens line;
wherein the dexter superior secondary lens segment span is determined during the examination process and is an element of the prescription that defines the dexter superior secondary lens;
wherein the dexter superior secondary lens segment span is the span of the distance between the dexter pupil center line and the center of the dexter superior secondary lens line;
wherein the dexter superior secondary lens is positioned on the eyeglasses frame such that the line used to measure the dexter superior secondary lens segment span is perpendicular to the transverse plane;
wherein the dexter superior secondary lens line is a straight line that forms the inferior boundary of the dexter superior secondary lens;
wherein the position of the dexter superior secondary lens line is determined using the dexter superior secondary lens segment span from the prescription that defines the eyeglasses frame;
wherein the dexter superior secondary lens line is perpendicular to the sagittal plane.

16. The multi-focal eyewear according to claim 15
wherein the sinister inferior secondary lens comprises a sinister inferior secondary lens power, a sinister inferior secondary lens segment span, and a sinister inferior secondary lens line;
wherein the sinister inferior secondary lens power is a measure of the power of the sinister inferior secondary lens;
wherein the sinister inferior secondary lens power is determined during the examination process and is an element of the prescription that defines the sinister inferior secondary lens;
wherein the sinister inferior secondary lens power is a number equal to the inverse of the focal length of the sinister inferior secondary lens;
wherein the sinister inferior secondary lens segment span is a measure of the position of the sinister inferior secondary lens on the sinister primary lens;
wherein the sinister inferior secondary lens segment span is determined during the examination process and is an element of the prescription that defines the sinister inferior secondary lens;
wherein the sinister inferior secondary lens segment span is the span of the distance between the sinister pupil center line and the center of the sinister inferior secondary lens line;
wherein the sinister inferior secondary lens is positioned on the sinister primary lens such that the line used to measure the sinister inferior secondary lens segment span is perpendicular to the transverse plane;
wherein the sinister inferior secondary lens line is a straight line that forms the superior boundary of the sinister inferior secondary lens;
wherein the position of the sinister inferior secondary lens line is determined using the sinister inferior secondary lens segment span from the prescription that defines the sinister primary lens;
wherein the sinister inferior secondary lens line is perpendicular to the sagittal plane.

17. The multi-focal eyewear according to claim 16
wherein the sinister superior secondary lens comprises a sinister superior secondary lens power, a sinister superior secondary lens segment span, and a sinister superior secondary lens line;
wherein the sinister superior secondary lens power is a measure of the power of the sinister superior secondary lens;
wherein the sinister superior secondary lens power is determined during the examination process and is an element of the prescription that defines the sinister superior secondary lens;
wherein the sinister superior secondary lens power is a number equal to the inverse of the focal length of the sinister superior secondary lens;
wherein the sinister superior secondary lens segment span is a measure of the position of the sinister superior secondary lens on the sinister inferior secondary lens line;
wherein the sinister superior secondary lens segment span is determined during the examination process and is an element of the prescription that defines the sinister superior secondary lens;
wherein the sinister superior secondary lens segment span is the span of the distance between the sinister pupil center line and the center of the sinister superior secondary lens line;
wherein the sinister superior secondary lens is positioned on the eyeglasses frame such that the line used to measure the sinister superior secondary lens segment span is perpendicular to the transverse plane;
wherein the sinister superior secondary lens line is a straight line that forms the inferior boundary of the sinister superior secondary lens;
wherein the position of the sinister superior secondary lens line is determined using the sinister superior secondary lens segment span from the prescription that defines the eyeglasses frame;
wherein the sinister superior secondary lens line is perpendicular to the sagittal plane.

18. The multi-focal eyewear according to claim 17
wherein the dexter inferior secondary lens power equals the dexter superior secondary lens power;
wherein the dexter inferior secondary lens segment span equals the dexter superior secondary lens segment span;
wherein the sinister inferior secondary lens power equals the sinister superior secondary lens power;

wherein the sinister inferior secondary lens segment span equals the sinister superior secondary lens segment span.

\* \* \* \* \*